Jan. 17, 1939.   R. LEE ET AL   2,143,920
PROTECTIVE MEANS FOR MOTOR SPEED REGULATORS
Filed Oct. 19, 1936.

WITNESSES
L. E. Kilian
C. L. Waal

INVENTORS
Royal Lee &
Warren E. Lueders
By R. S. Caldwell
ATTORNEY

Patented Jan. 17, 1939

2,143,920

UNITED STATES PATENT OFFICE 2,143,920

PROTECTIVE MEANS FOR MOTOR SPEED REGULATORS

Royal Lee, Milwaukee, and Warren E. Lueders, Wauwatosa, Wis., assignors to Lee Engineering Research Corporation, Milwaukee, Wis., a corporation of Wisconsin Application October 19, 1936, Serial No. 106,306

12 Claims. (Cl. 175—294)

The invention relates to protective means for circuit-closers and to motor speed regulators embodying the same.

Many motor-driven appliances and machines, especially in the smaller sizes, are required to operate on either direct current or alternating current, which ever is available, and for this purpose universal or series motors are widely used. A disadvantage of this type of electric motor for certain applications is its variable speed under different loads, but this disadvantage has been obviated by the use of suitable speed governors or regulators, such as those described in Patents 1,630,394 and 1,767,146 to Royal Lee, dated May 31, 1927, and June 24, 1930, respectively. Governors of the type disclosed in these patents include speed-responsive vibratory circuit-closers. When motors with governors of this type are operated on direct current, especially from the usual 110 volt supply circuits and in continuous duty, it is found that the circuit-closer contacts are subject to sticking, pitting, and building-up, notwithstanding the employment of the usual protective condensers, thereby causing premature failure of the contacts and irregular running of the motor. In the event of sticking of the contacts, the speed of the motor will rise above normal. It is further found that the protective condensers themselves are subject to break-down. The use of pole-changing means, such as rotary commutators, has been suggested to alleviate the condition, but this is found to be unsatisfactory for various reasons, such as the added complication and the adverse effect when the motor is operated on alternating current.

It is an object of the invention to provide improved protective means for circuit-closers which will maintain the circuit-closer contacts in good operating condition throughout their normal life.

Another object of the invention is to provide improved means which will protect the circuit-closer contacts when operating on direct current and will not interfere with the operation of the circuit-closer on alternating current.

A further object of the invention is to provide circuit-closer protective means which will prevent break-down of a protective condenser for the circuit-closer.

A further object is to provide an improved motor-regulating system which includes the protective means and which will operate satisfactorily on alternating current and direct current.

A further object is to provide a motor regulating system having a rotary centrifugally operated circuit-closer with a cooperating condenser mounted thereon to form a local oscillatory circuit with the circuit-closer, whereby to avoid inclusion of brush contacts in such circuit and to obtain short leads.

The invention further consists in the several features hereinafter described and claimed.

In the accompanying drawing, illustrating certain embodiments of the invention,

Figure 1:
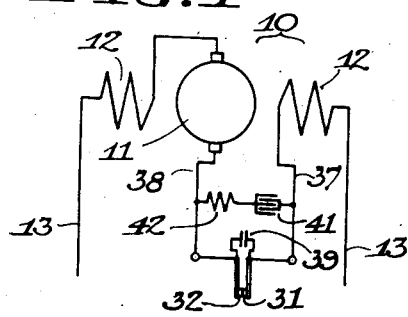
Fig. 1 is a schematic diagram of a motor regulating system embodying the invention.

In the drawing, 10 designates an electric motor of the series or universal type having an armature 11 and field windings 12, the armature being here shown interposed between the field windings, and the motor being adapted for operation on either direct current or alternating current from line conductors 13.

In order to maintain a constant but adjustable motor speed, the motor is provided with a suitable speed regulator, preferably in the form of a centrifugally operated circuit-closer of the general type shown in the above-mentioned Patents 1,630,394 and 1,167,146. A rotary disk 14 of insulating material is carried on a hub 15 and is secured on an end of the armature shaft 16 in any suitable manner. One side of the disk 14 carries a pair of concentric flat collector rings 17 and 18 against which respectively bear spring-pressed brushes 19 and 20 mounted on, but insulated from, the motor frame. The other side of the disk carries spaced angle brackets 21 and 22 which are electrically connected to the collector rings 17 and 18, respectively, by rivets 23 and 24, respectively, these rivets also rigidly securing the several parts together in assembled relation. Balancing counterweights 25 are secured to the bracket side of the disk by rivets 26, which also form attaching members for the collector ring 17. In addition, other rivets 27 and 28 are provided to anchor the respective collector rings to the disk and to secure the parts in assembled relation.

A pair of parallel leaf springs 29 and 30 arranged side by side and facing each other have their adjacent ends riveted or otherwise secured to the brackets 21 and 22, respectively, and carry cooperating contacts 31 and 32, respectively, near their free ends, the contacts being preferably formed of tungsten or other resistant metal. Under the influence of centrifugal force the contact-loaded free end of the spring 29 tends to be deflected outwardly and is limited against excessive movement by a stop pin 33 carried by the insulating disk. An angle bracket 34 is secured to the contact-carrying side of the disk by rivets 35 which also secure the collector ring 18 to the disk. A cone-pointed set-screw 36 is tightly screw-threaded into the bracket 34 and bears against the base for the contact 32 to adjust the flexural stress on the leaf spring 30, and thereby adjust the speed-setting of the circuit-closer. In cases where adjustment of the speed-setting is desired while the motor is operating, the adjusting means shown in the above mentioned Patent 1,767,146 may be employed.

The contacts 31 and 32 on the rotary disk are included in the motor circuit and periodically separate under the influence of centrifugal force to control the mean value of motor current, and thereby regulate the motor speed. The brush 19 bearing on the collector ring 17 is connected by a conductor 37 to one end of one field winding 12, and the other brush 20 is connected to one armature brush by a conductor 38. The contacts 31 and 32 of the circuit-closer are thus connected between one end of one field winding and one of the armature brushes to be directly in series with the motor windings. By placing the circuit-closer contacts in this location, the field windings will form choke coils or reactors in both line conductors serving to prevent or minimize the transmission to these conductors of electrical disturbances originating at the circuit-closer.

The motor as above described will operate on either direct current or alternating current, whichever is available. For operation on direct current, however, it is necessary or desirable to provide some means for protecting the contacts from deterioration or destruction. An obvious expedient, and one well known in the art, is to connect a condenser of suitable capacity directly across the contacts. It is found, however, that this expedient is not entirely satisfactory, as in many cases the contacts are still subject to sticking, pitting, and building-up, and moreover, the condenser itself is subject to break-down by reason of the peculiar characteristics of the circuit.

Figure 3:
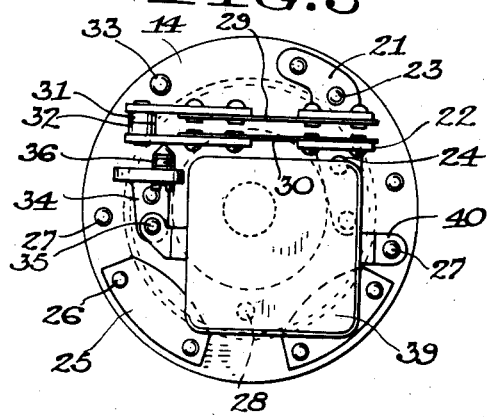
Fig. 3 is an end elevation of a centrifugal circuit-closer embodying certain features of the invention.
Figure 4:
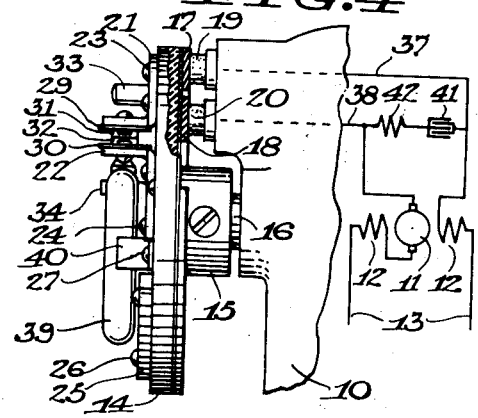
Fig. 4 is a side elevation of the circuit-closer applied to an electric motor, parts being broken away and parts being shown in section, and a schematic diagram of a motor regulating system being included.

A means for adequately protecting the contacts will now be described. A small inexpensive condenser 39 is connected directly in parallel with the contacts 31 and 32 of the circuit-closer to form a local oscillatory circuit therewith, and is preferably mounted on the rotary disk 14 so that the brushes 19 and 20 are not included in this circuit and short leads are obtained. The condenser 39 is preferably of the low-loss mica type, and the capacity thereof is on the order of 5000 micromicrofarads (0.005 mfd.), which has been found to be sufficient. The condenser 39 is mounted on the same side of the rotary disk as the contacts, and has terminal mounting lugs 40 secured to the disk by one of the rivets 27 and one of the rivets 35, so as to connect the lugs to the respective slip rings 17 and 18, thereby connecting the condenser to the contacts. A condenser 41 of somewhat larger capacity than the condenser 39 is connected across the conductors 37 and 38, so as to be in parallel to the contacts 31 and 32. During the operation of the motor, energy is intermittently stored in the inductive portions of the circuit, and the condenser 41 serves to absorb the surge of current which flows at the instant the contacts separate, thus insuring a clean and sudden break of current at the contacts, and suppressing or minimizing sparking or arcing. Preferably, the condenser 41 has in series with it a high-frequency choke coil or inductive reactor 42, this condenser and reactor in series therewith being connected as a shunt around the contacts. The capacity of the condenser 41 is on the order of one-half to two microfarads (½ to 2 mfd.). This condenser may be of the ordinary inexpensive wound paper-insulated type, and in some instances may be of the electrolytic type. A suitable choke coil or reactor for certain types of motor governors consists of twelve to twenty-five turns of No. 16 wire wound to one-half inch diameter, no magnetic core being used. A reactor of this type has an inductance ranging from 1 to 6 microhenries, and has a resistance of a small fraction of an ohm and a negligible reactance to low frequency currents. The probable function of the choke coil or reactor 42, which has a low ohmic resistance, is to isolate (with respect to high-frequency currents) the condenser 41 from the high-frequency oscillatory circuit which includes the condenser 39 and contacts 31 and 32, and to prevent high voltage peaks or surges on the condenser 41, as well as to prevent the establishment of heavy oscillatory currents in the condenser 41, especially currents of the higher frequencies, so as to avoid premature destruction of the latter condenser. In the form of the invention shown in Figs. 3 and 4, the condenser 41 and reactor 42 are not carried on the governor disk, so that the weight of the disk will be kept fairly low. The low capacity condenser 39 is comparatively light in weight.

When the motor is at rest the centrifugally influenced contact 31 is urged by its supporting spring 29 into engagement with the contact 32. When the motor is connected to the line conductors 13, current flows through the motor windings and governor contacts, causing the motor to start in operation. As the motor accelerates, the spring-mounted contact 31 is urged outwardly under the influence of centrifugal force to break the motor circuit at a predetermined speed. The motor speed thereupon drops slightly and permits the contacts to re-engage, and the cycle of operation is repeated. In practice, the fluctuation in motor speed is very slight and hardly noticeable, the governor contact 31 vibrating at a relatively high-frequency, say from 50 to 300 cycles per second, so as to obtain good speed regulation.

The current interruptions result in the setting up of trains of energy-dissipating high-frequency or radio-frequency currents in the oscillatory circuit comprising the governor contacts, the condenser 39, and the connecting leads. When the motor is operated on direct current, the current pulses through the contacts are largely converted into these high-frequency or radio-frequency currents which will not damage the contacts and will not cause pitting and building-up of the contacts. The choke coil or reactor 42, together with the inductance of the connecting leads, prevents the large capacity condenser 41 from, in effect, short-circuiting the oscillatory circuit, or excessively affecting the period or damping of the latter circuit, and also prevents the establishment of heavy oscillatory currents in the large capacity condenser and the impression of high peak voltages thereon, which would result in premature destruction of the condenser, especially in the case of the ordinary wound paper-insulated type of condenser. The reactor 42, however, offers but very little impedance to low frequency currents or current pulses and does not interfere with the normal charging and discharging of the condenser 41.

When the motor is operated on alternating current, some of the effects above described are obtained, although the use of contact-protecting means is then not so essential, as the alternations of the current are ordinarily sufficient to prevent damage to the contacts. In any event, however, the contact-protecting means will not interfere with the proper operation of the motor on alternating current, so that no adjustments or changes in the structure will be required after the motor leaves the factory, the motor being operable on either direct current or alternating current, whichever is available to the user.

Figure 5:
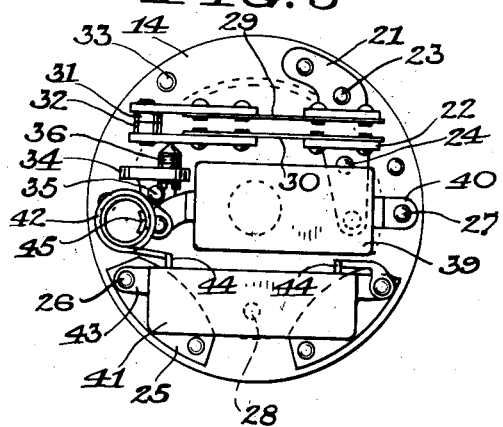
Fig. 5 is an end elevation of a modified form of centrifugal circuit-closer.
Figure 6:
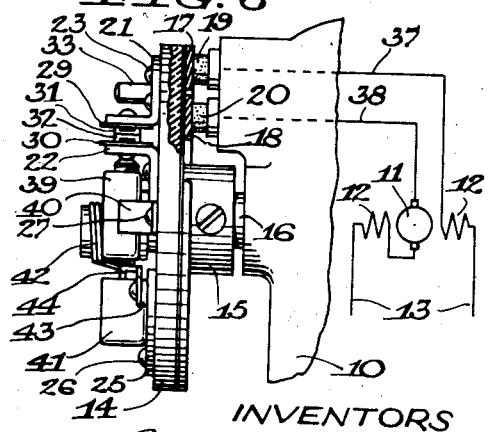
Fig. 6 is a side elevation partly in section of the circuit-closer of Fig. 5, as applied to an electric motor, a schematic diagram of the motor regulating system being included.

In the modified form of motor governor shown in Figs. 5 and 6, the governor rotor 14 has mounted thereon the condensers 39 and 41 and the choke coil or reactor 42, so that short leads are obtained and the brushes are excluded from the circuit connecting the condensers. In addition, the parts are air-cooled by the rotation of the rotor. The large capacity condenser 41 is secured to the governor rotor by mounting lugs 43 and has terminal lugs 44, one of which is connected to the slip ring 17 and the other to a terminal of the reactor 42. The supporting tube or form for the reactor is secured in place by a suitable bracket 45. The circuit is the same as that shown in Fig. 1, and the mechanical and electrical operation of the apparatus is the same as that of the apparatus of Figs. 3 and 4.

Figure 2:
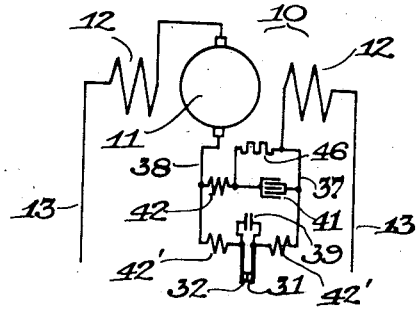
Fig. 2 is a schematic diagram of a modified form of motor regulating system.

The modified form of motor regulating system shown in Fig. 2 is similar to that of Fig. 1, except that certain elements have been added. In addition to the choke coil or reactor 42 one or more similar reactors 42' are introduced in one or both of the conductors 37 and 38 to more fully isolate, with respect to radio-frequency currents, the vibratory circuit-closer and condenser 39 from the motor windings and condenser 41. The total inductance and resistance of the series-connected reactors 42 and 42' have about the same values as the inductance and resistance of the reactor 42 when the latter is used in the system of Fig. 1, and the condensers 39 and 41 have the same capacities as the corresponding condensers of the system of Fig. 1. In some instances, a resistor 46 is connected across the condenser 41 so that the circuit-closer will interrupt only a part of the motor current. The resistance of the resistor 46 is not critical and may range from several hundred to several thousand ohms. However, if this resistance is too small, the local oscillatory circuit may fail to function, or it may be impossible to reduce the motor speed to a desired value. The operation of the system of Fig. 2 is essentially the same as that of Fig. 1.

The optimum values of the capacities of the condensers 39 and 41 and the inductances of the reactors 42 and 42' will ordinarily be different for motors of different sizes and characteristics, and can readily be determined by experiment. If the capacity of the condenser 39 is either too small or too large, the regulator contacts will tend to pit and build up when operating on direct current. In general, if craters or pits tend to form on the negative regulator contact, the capacity of the condenser 39 should be increased. If the inductance of the reactor 42 (or the combined reactance of the reactors 42 and 42') is too small, the large condenser 41 tends to overheat and break down, and sparking appears at the brushes; and if either the inductance or resistance of the reactor or reactors is too large, there will be undue sparking at the contacts.

The circuit-closer protecting means of the invention is applicable to various motor-regulating systems and is further applicable to the circuit-closers of other apparatus, such as ignition apparatus, relays, rectifiers, and voltage regulators.

What we claim as new and desire to secure by Letters Patent is:

1. The combination, with an electric circuit having therein circuit-closer contacts, of an oscillatory circuit including a condenser and said contacts, a second condenser of relatively greater capacity connected in parallel to said contacts, and low-resistance means in series with said second condenser for preventing said second condenser from materially influencing the characteristics of said oscillatory circuit while permitting relatively rapid charging and discharging of said second condenser, said second condenser and low-resistance means in series therewith being connected as a shunt around said contacts.

2. The combination, with an electric circuit having therein circuit-closer contacts, of an oscillatory circuit including a condenser and said contacts, a second condenser of relatively greater capacity connected in parallel to said contacts, and low-resistance means in series with said second condenser for preventing the flow of heavy oscillatory currents in said second condenser while permitting relatively rapid charging and discharging of said second condenser upon opening and closing of said contacts, said second condenser and low-resistance means in series therewith being connected as a shunt around said contacts.

3. The combination, with an electric circuit having therein circuit-closer contacts, of an oscillatory circuit including a condenser and said contacts, a second condenser of substantially larger capacity connected in parallel to said contacts, and a low-resistance high-frequency choke coil in series with said second condenser and connected as a shunt around said oscillatory circuit and the contacts in said oscillatory circuit.

4. The combination, with an electric circuit having therein circuit-closer contacts at least one of which is vibratory for periodically separating from the other at a high rate of interruption, of a condenser connected in parallel to said contacts to form an oscillatory circuit therewith, a second condenser of relatively larger capacity connected in parallel to said contacts, and a low-resistance high-frequency choke coil in series with said second condenser and connected as a shunt around said oscillatory circuit and the contacts in said oscillatory circuit, said choke coil excluding high-frequency currents from said second condenser while permitting rapid charging and discharging of said second condenser upon the opening and closing of said contacts.

5. The combination of a rotatable member, a pair of cooperating contacts mounted on said rotatable member and forming a centrifugally-operated circuit-closer, a condenser mounted on said rotatable member and connected in parallel to said contacts to form therewith an oscillatory circuit, and means for conducting current to said contacts, said oscillatory circuit being wholly included on said rotatable member.

6. The combination of a rotatable member, a pair of cooperating contacts mounted on said rotatable member and forming a centrifugally-operated circuit-closer, a condenser mounted on said rotatable member and connected in parallel to said contacts to form therewith an oscillatory circuit, means for conducting current to said circuit-closer including a brush, and a second condenser of relatively greater capacity connected in parallel to said contacts, said brush being in circuit between said condensers, and said oscillatory circuit being wholly included on said rotatable member.

7. The combination of a motor speed regulator having a rotatable member, a pair of cooperating contacts mounted on said rotatable member and forming a centrifugally-operated vibratory circuit-closer, a condenser mounted on said rotatable member and connected in parallel with said contacts, and means for conducting at least a part of the motor current to said contacts, said contacts and condenser forming an oscillatory circuit wholly included on said rotatable member.

8. The combination of a rotatable member, a pair of cooperating contacts mounted on said rotatable member and forming a centrifugally-operated circuit-closer, a pair of condensers mounted on said rotatable member and each connected in parallel to said contacts, a low-resistance high-frequency choke coil mounted on said rotatable member and connected in series between said condensers, said choke coil and one of said condensers in series therewith being connected as a shunt around said contacts, and means for conducting current to said circuit-closer, said oscillatory circuit being wholly included on said rotatable member.

9. The combination with an electric circuit having therein circuit-closer contacts, of a condenser connected in parallel to said contacts to form an oscillatory circuit therewith, a second condenser of relatively greater capacity connected in parallel to said contacts, a low-resistance high-frequency choke coil in series with said second condenser connected as a shunt around said contacts, and a second similar choke coil in series with said first-named circuit.

10. The combination, with a direct-current electric circuit having therein current-interrupting contacts, of an oscillatory circuit comprising a condenser and said contacts, a second condenser of relatively larger capacity connected in parallel to said contacts, and a low-resistance high-frequency choke coil connected in series between said second condenser and said oscillatory circuit, said choke coil and second condenser in series therewith being connected as a shunt around said contacts, the direct current flowing across the contacts when they separate being largely converted into high-frequency currents in said oscillatory circuit to prevent pitting and building-up of said contacts.

11. The combination, with an electric circuit having therein circuit-closer contacts, of an oscillatory circuit including a condenser and said contacts, and a second condenser of substantially larger capacity in series with a low-resistance high-frequency choke coil connected as a direct shunt around said contacts.

12. The combination, with a main electric circuit having therein circuit-closer contacts, of an auxiliary high-frequency oscillatory circuit including said contacts, and a condenser in series with a low-resistance choke coil connected as a direct shunt around said contacts, said choke coil having a negligible reactance to low-frequency currents but a relatively high reactance to high-frequency currents.

ROYAL LEE.
WARREN E. LUEDERS.